Patented Nov. 5, 1946

2,410,554

UNITED STATES PATENT OFFICE 2,410,554

PRODUCTION OF AROMATIC COMPOUNDS

Herman Pines and Vladimir N. Ipatieff, Chicago, Ill., assignors to Universal Oil Products Company, Chicago, Ill., a corporation of Delaware No Drawing. Application November 24, 1944, Serial No. 565,051

12 Claims. (Cl. 260—671)

This invention relates to reactions of unsaturated ketones with aromatic hydrocarbons to produce aromatic compounds including alkylated aromatic hydrocarbons and aromatic ketones.

An object of this invention is the preparation of alkylated aromatic hydrocarbons and aromatic ketones by reacting an aromatic hydrocarbon and an α-olefinic ketone in the presence of a fluoride catalyst.

Another object of this invention is the manufacture of alkyl aromatic hydrocarbons and aromatic ketones by interaction of aromatic hydrocarbons and α-olefinic ketones in the presence of a catalyst comprising essentially hydrogen fluoride and boron trifluoride.

A further object of this invention is the manufacture of alkyl aromatic hydrocarbons and aromatic ketones by reaction of an aromatic hydrocarbon and an α-olefinic ketone in the presence of a catalyst comprising hydrogen fluoride as its essential active ingredient.

By our process, an aromatic hydrocarbon may be reacted with any unsaturated ketone which may be distilled without substantial decomposition and which has a hydrogen atom attached to a saturated carbon atom in the alpha position with respect to the carbonyl group. The olefinic ketones utilizable in our process may be represented by the type formula

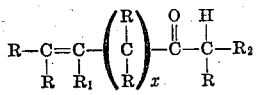

where $x$ is an integer which may be zero and any or all of the components R and $R_1$ may be hydrogen or the same or different alkyl or cyclic or alicyclic groups or any two of the R's may jointly stand for a part of a cyclic structure. $R_2$ may be an alkyl or an alicyclic group which, as shown by the formula, is joined to the carbonyl group by an aliphatic carbon atom having at least one hydrogen atom attached thereto.

The unsaturated ketone used in any particular case will depend upon the products desired such as alkylated aromatic hydrocarbons and aromatic ketones. However, we prefer to employ aliphatic unsaturated ketones and particularly unsaturated ketones having an olefinic carbon atom not more than twice removed from a carbonyl group and more preferably connected directly thereto. A still further preferred group of unsaturated ketones comprises those containing a tertiary unsaturated carbon atom such as mesityl oxide and its homologues. Unsaturated ketones which may be used in our process may be obtained from any source. A means of producing olefinic ketones suitable for our process comprises dehydration of the corresponding hydroxy ketones which may be prepared by the condensation of a ketone with itself or with another ketone or with an aldehyde or by other suitable means.

Aromatic hydrocarbons which are reacted with olefinic ketones as herein set forth include benzene, toluene, xylenes, monopropyl benzene, monobutyl benzene, and other higher boiling and more highly alkylated benzene hydrocarbons which contain a hydrogen atom replaceable by an alkyl group. Also polycyclic aromatic hydrocarbons and alkyl polycyclic aromatic hydrocarbons may be utilized in our process.

The process of our invention is carried out by contacting an alkylatable aromatic hydrocarbon and an olefinic ketone at a temperature of from about 0° to about 150° C. in the presence of a fluoride catalyst comprising essentially hydrogen fluoride or a mixture of hydrogen fluoride and boron trifluoride. These catalysts are not equivalent in their action as the hydrogen fluoride-boron fluoride mixture is generally of higher activity than is hydrogen fluoride itself. With hydrogen fluoride as catalyst we prefer to use an operating temperature of from about 50° to about 100° C. The process is usually carried out in a reactor provided with adequate means of agitation suitable for withstanding a pressure of from substantially atmospheric to about 100 atmospheres, although higher pressures are also sometimes desirable.

The production of alkylated aromatic hydrocarbons by the interaction of an aromatic hydrocarbon with an olefinic ketone in the presence of hydrogen fluoride catalyst is unexpected, particularly since the prior art disclosed the production of β-phenylisobutyl methyl ketone by the condensation of benzene and mesityl oxide in the presence of aluminum chloride. When benzene and mesityl oxide were interacted according to the process of our invention in the presence of substantially anhydrous hydrogen fluoride, a reaction product was formed containing a substantial proportion of tertiary-butylbenzene but no β-phenylisobutyl methyl ketone. Other ketones and aromatic hydrocarbons react similarly in the presence of liquid hydrogen fluoride to give alkylated and polyalkylated aromatic compounds.

The process of our invention and its commercial value are indicated further by the following examples, although they are not introduced with

Example I 156 grams of benzene, 49 grams of mesityl oxide, and 200 grams of substantially anhydrous hydrogen fluoride were stirred in an autoclave at 60° C. for 4 hours. The resultant reaction product after separation from the hydrogen fluoride layer was washed, dried, and distilled to give a 38% yield of tertiary-butylbenzene based upon the amount of mesityl oxide charged.

Example II 184 grams of toluene, 49 grams of mesityl oxide, and 170 grams of liquid hydrogen fluoride were placed in a stainless steel autoclave of 850 cc. capacity and stirred at 65° C. for two hours at a pressure of from 3.5 to 4 atmospheres. The resultant reaction product contained 40% of para-methyl tertiary-butylbenzene based upon the amount of mesityl oxide charged. Also a 10–20% yield of methyl para-tolyl ketone was obtained, this yield also being based upon the amount of mesityl oxide charged.

The character of the process of the present invention and particularly its commercial value are evident from the preceding specification and examples.

We claim as our invention:

1. A process for producing alkyl aromatic hydrocarbons which comprises reacting in the presence of hydrogen fluoride an aromatic hydrocarbon and an unsaturated ketone in which hydrogen is attached to at least one of the carbon atoms adjacent to the carbonyl carbon atom.

2. A process for producing alkyl aromatic hydrocarbons which comprises reacting at a temperature of from about 0° to about 150° C. in the presence of liquid hydrogen fluoride an aromatic hydrocarbon and an aliphatic unsaturated ketone in which hydrogen is attached to at least one of the carbon atoms adjacent to the carbonyl carbon atom.

3. A process for producing alkyl aromatic hydrocarbons which comprises reacting at a temperature of from about 0° to about 150° C. in the presence of liquid hydrogen fluoride an aromatic hydrocarbon and an aliphatic mono-olefinic ketone in which hydrogen is attached to at least one of the carbon atoms adjacent to the carbonyl carbon atom.

4. A process for producing alkyl aromatic hydrocarbons which comprises reacting at a temperature of from about 0° to about 150° C. in the presence of liquid hydrogen fluoride an aromatic hydrocarbon and a mono-olefinic ketone in which hydrogen is attached to a carbon atom adjacent to the carbonyl carbon atom.

5. A process for producing alkyl aromatic hydrocarbons which comprises reacting at a temperature of from about 0° to about 150° C. in the presence of liquid hydrogen fluoride an aromatic hydrocarbon and an aliphatic mono-olefinic ketone in which hydrogen is attached to a carbon atom adjacent to the carbonyl carbon atom.

6. A process for producing alkyl aromatic hydrocarbons which comprises reacting an aromatic hydrocarbon and an aliphatic ketone of the formula

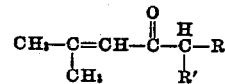

wherein R and R' represent members of the group consisting of hydrogen and alkyl radicals at a temperature of from about 0° to about 150° C. in the presence of hydrogen fluoride.

7. A process for producing alkyl aromatic hydrocarbons which comprises reacting an aromatic hydrocarbon and an aliphatic ketone of the formula

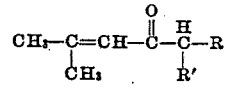

wherein R and R' represent different alkyl radicals at a temperature of from about 0° to about 150° C. in the presence of a catalyst comprising hydrogen fluoride as its essential active ingredient.

8. A process for producing alkylated benzene hydrocarbons which comprises reacting a benzene hydrocarbon and an aliphatic ketone of the formula

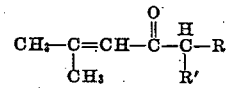

wherein R and R' represent members of the group consisting of hydrogen and alkyl radicals at a temperature of from about 0° to about 150° C. in the presence of a fluoride catalyst comprising hydrogen fluoride.

9. A process for producing alkylated benzene hydrocarbons which comprises reacting benzene and an aliphatic ketone of the formula

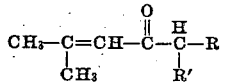

wherein R and R' represent members of the group consisting of hydrogen and alkyl radicals at a temperature of from about 0° to about 150° C. in the presence of liquid hydrogen fluoride.

10. A process for producing tertiary-butylbenzene which comprises reacting benzene and mesityl oxide in the presence of liquid hydrogen fluoride at a temperature of from about 0° to about 150° C.

11. A process for producing tertiary-butylbenzene which comprises reacting benzene and mesityl oxide in the presence of hydrogen fluoride and boron fluoride at a temperature of from about 0° to about 150° C.

12. A process for producing para-methyl tertiary-butylbenzene which comprises reacting toluene and mesityl oxide at a temperature of from about 0° to about 150° C. in the presence of liquid hydrogen fluoride.

HERMAN PINES.
VLADIMIR N. IPATIEFF.